Figure 1:
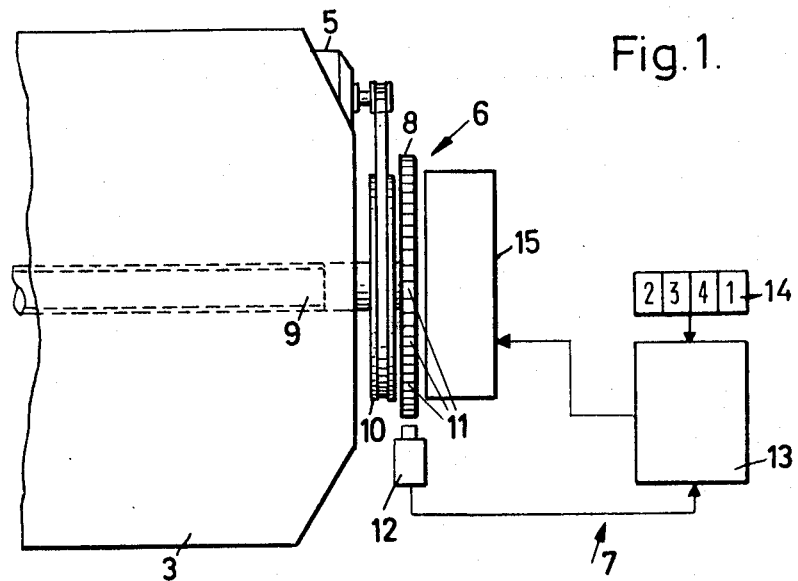

United States Patent

[11] 3,602,348

[72] Inventor Rudolf Mohr
 Hattersheimer Strasse 6239, Hofheim/Ts, Germany
[21] Appl. No. 769,116
[22] Filed Oct. 21, 1968
[45] Patented Aug. 31, 1971
[32] Priority Oct. 26, 1967
[33] Germany
[31] P 15 36 468.8

[54] AUTOMATIC PULSE CONTROL UNIT FOR THE DRIVE OF CUTTING MACHINES FOR PAPER, CARDBOARD OR THE LIKE
3 Claims, 2 Drawing Figs.
[52] U.S. Cl............................................................. 192/127,
 83/277, 83/522, 192/33, 192/142, 235/151.11
[51] Int. Cl........................................................F16d 43/26,
 B23q 17/18
[50] Field of Search.................................................. 310/111,
 168, 155; 323/90; 235/151.11, 92, 61.11(4);
 340/168; 322/3, 99; 83/62, 80, 81, 109, 110, 157,
 208, 298, 360, 361, 363, 367, 368, 369, 277, 522;
 214/1.6; 192/33, 127, 142

[56] References Cited
UNITED STATES PATENTS
3,172,026 3/1965 Schuman...................... 235/151.11 X
3,209,221 9/1965 Pugsley et al..................235/151.11 UX
3,244,863 4/1966 Paterson...................... 235/151.11
3,251,255 5/1966 Bauman .......................235/151.11 UX
3,267,781 8/1966 Sterns et al................... 83/298

FOREIGN PATENTS
1,197,213 7/1965 Germany..................... 83/369

Primary Examiner—Malcolm A. Morrison
Assistant Examiner—R. Stephen Dildine, Jr.
Attorney—Holman & Stern ABSTRACT: An automatic pulse control means for use on machines employed for cutting paper, cardboard or the like, more especially for controlling the advance of the feed chuck of such machines, wherein the coupling disc of the magnetic coupling is constructed as a pulse generator, comprising teeth along the whole of its circumference which influence the field of a magnetic head in such a manner, that when one of said teeth comes within the range of said magnetic head the field of the latter is varied and generates a resulting pulse which operates an arbitrarily preset subtracting counter mechanism with the effect whereby when the zero position of the latter is reached, it transmits said pulse for the control of the magnetic coupling. The system may operate either as a cut-sequencing unit for executing cuts of uniform width when provided with a single counter, or for executing a cutting program featuring cuts of different width by providing a plurality of counters, on which different number of pulses and thereby different cutting widths can be preset by means of the preselector switch associated with the counter mechanism in both cases.

INVENTOR:
RUDOLF MOHR

By Glascock, Downing & Seebold.

Attorneys

AUTOMATIC PULSE CONTROL UNIT FOR THE DRIVE OF CUTTING MACHINES FOR PAPER, CARDBOARD OR THE LIKE

The present invention relates to an automatic pulse control unit, in particular for controlling the drive of a machine employed for cutting paper, cardboard or the like.

It is already known to control the drives of machine tools and similar machines by means of magnetic tapes read by magnetic heads. It is further known to execute this type of control by means of program discs scanned by mechanical, electronic or optical means, where the pulses generated during the scanning of the program disc are fed to a counter, which then acts on the drive of these machines in accordance with the desired operating sequence.

A digital control system of this kind has already been proposed for the drive of the feed chuck of a paper-cutting machine, consisting of a control plate coupled with a driving spindle of the feed chuck, said plate being optically scanned and transmitting the pulses through a counter to the drive motor.

All the known pulse-controlled drive units require the provision of additional elements to the machine to be controlled, namely the control devices to be scanned, such as tapes, program discs or the like.

It is an object of the present invention to provide a pulse control unit, which is so constructed and arranged that a predetermined program sequence can be carried out without additional machine elements such as program discs, or similar data carriers.

The present invention consists in an automatic pulse control means for cutting machines for papers, cardboard, or the like, wherein a coupling disc of a magnetic coupling is constructed to serve both as a driving element and as a control element for controlling the advance of a feed chuck for the automatic execution of a cutting program.

According to the invention, the coupling disc may be provided with teeth along its periphery, which influence the field of a magnetic head in such a manner, that when a tooth comes into the range of the magnetic head, the field of the latter is varied, and the pulse thus produced actuates an arbitrarily preset counter with the effect whereby when the zero position of said counter is reached, it transmits this pulse for the control of the magnetic coupling.

The type of construction with a single machine element, namely a coupling disc, can control firstly the drive of a feed chuck spindle and secondly can provide transmission or generation of pulses for the automatic program control of said feed chuck.

In the accompanying drawings

Figure 2:
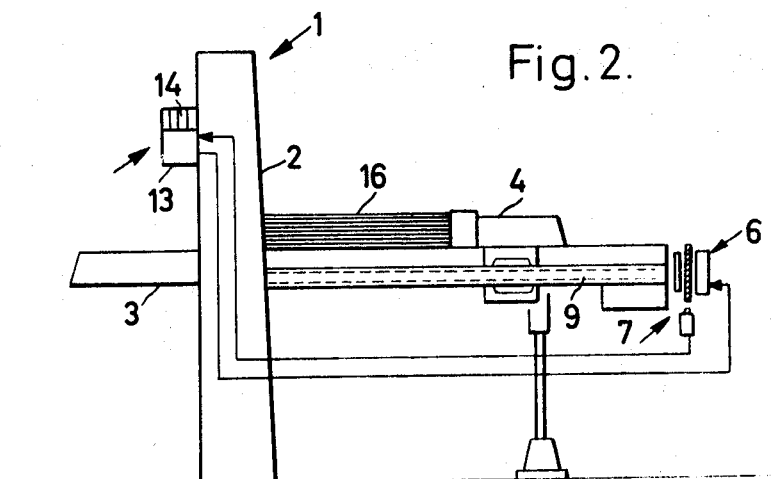

FIG. 1 shows a part of a paper-cutting machine with a control unit according to the present invention in schematical presentation; and FIG. 2 shows the general arrangement of the device on a paper cutting machine, in side elevation.

In carrying the invention into effect by way of example a drawings show in FIGS. 1 and 2, the paper-cutting machine 1 constituted by the machine frame 2, the work table 3, the feed chuck 4, the drive motor 5, the magnetic coupling 6 and the control unit 7. In the position here shown, the coupling disc, which simultaneously constitutes the control-plate 8, is in cooperative contact with the driving spindle 9 of feed chuck 4. The control-plate 8 is actuated by the motor 5 and the driving pulley 10, i.e. rotated. During this rotation the teeth 11 of the control—or coupling disc 8 enter into the range of the magnetic head 12 and generate pulses which are transmitted to the counting mechanism 13. The subtracting counter 13 comprises a preselector switch 14, by means of which the desired number of pulses can be preset in the known manner. Each tooth 11 of control disc 8 produces a pulse, so that when the number of the generated pulses equals the number preset by means of the preselector switch, the subtracting counter returns to zero owing to the inverse counting sequence. On reaching the zero position, the counter 13 transmits a driving pulse to the braking magnet 15 of magnetic coupling 6, whereby the coupling—or control disc 8 is attracted by the braking magnet, thus stopping the drive of spindle 9 of feed chuck 4. During the revolution of the control disc 8 the feed chuck has executed a predetermined advancing movement, which corresponds to the preset number of pulses of the preselector switch 14. During this movement, the material to be cut 16 was advanced by an equal measure, so that the cut can now be carried out. After completion of the cut, a known automatic means again releases the coupling disc from the braking magnet 15, so that it comes into cooperative contact with the driving spindle and effects in the aforedescribed manner both the advance of the chuck and the program control, i.e. the transmission of the pulses via the magnetic head 12 to the counter 13. This working cycle is repeated until the entire stock of paper 16 has been sectioned in accordance with the cutting width set by means of the number of pulses on the preselector switch.

When a counting mechanism of the kind here shown is used, cuts of equal width are executed over the entire length of the material, i.e. the control serves as a cut-sequencing device. If, on the other hand, cuts of different widths have to be carried out, then a plurality of counters must be provided in accordance with the number of different cuts, which counters then have to be set to different number of pulses and thus to the desired widths of cut by means of the preselector switch.

The device described above thus makes it possible to execute a multiplicity of cutting programs by providing the requisite counters. These cutting programs are moreover achieved without alteration in the construction and arrangement of the control disc and without altering its double function of drive and control element.

I claim:

1. Automatic pulse control means for cutting machines for paper, cardboard, or the like, comprising magnetic clutch means including a rotatably coupling disk, said coupling disk having thereon pulse-producing means for producing signal pulses representative of the degree of rotation of said disk; subtracting counter means operatively associated with said pulse-producing means for counting the number of pulses produced and subtracting the number of pulses from a preset value, and for producing a driving pulse when said subtracting pulse reaches zero; and breaking magnet means operatively connected to said counter means and adapted to break said coupling disk upon receipt of a driving pulse from said counter means.

2. Automatic pulse control means according to claim 1, wherein said pulse-producing means comprises a plurality of teeth spaced about the periphery of said coupling disk, said pulse control means further comprising a stationary magnetic head positioned adjacent to and spaced slightly from the periphery of said coupling disk, whereby rotation of said coupling disk will cause said magnetic head to produce a single pulse each time one of said teeth comes into proximity with said magnetic head, said magnetic head being operatively connected to said subtracting counter means to transmit said pulses to said counter means.

3. Automatic pulse control means as defined in claim 2, further comprising preselector switch means for presetting a desired value into said subtracting counter means, whereby the number of said signal pulses required to return said subtracting counter to zero and hence to activate said breaking magnet means may be preselected.